United States Patent [19]
Cante et al.

[11] 3,889,000
[45] June 10, 1975

[54] PERCOLATOR PACKAGES AND PROCESS THEREFOR

[75] Inventors: Charles J. Cante, Ossining; John R. Frost, Yonkers, both of N.Y.

[73] Assignee: General Foods Corporation, White Plains, N.Y.

[22] Filed: May 30, 1973

[21] Appl. No.: 365,306

[52] U.S. Cl. ............... 426/84; 99/295; 426/77; 426/113; 426/365; 426/433
[51] Int. Cl. ................. A23f 1/08; A23f 19/14
[58] Field of Search ............... 426/77–84, 426/433, 394, 365; 99/295, 306

[56] References Cited
UNITED STATES PATENTS

| | | | |
|---|---|---|---|
| 3,386,834 | 6/1968 | Noiset | 426/84 |
| 3,511,666 | 5/1970 | Hudson et al. | 426/394 |

*Primary Examiner*—Frank W. Lutter
*Assistant Examiner*—N. Greenblum
*Attorney, Agent, or Firm*—Bruno P. Struzzi; Thomas V. Sullivan; Thomas R. Savoie

[57] ABSTRACT

Roasted and ground coffee, preferably compressed in the form of a tablet, is enclosed within a porous filter material to form a percolator package. The package is provided with a sufficient amount of a linear organosiliconoxide polymer to effect a weight concentration in the brewed coffee of at least 0.2 parts of the silicone polymer per million parts of brew liquid. The organosilicone compound counteracts anionic or nonionic surfactants that might be present in the brew, and which, especially in the absence of coffee particles in the brew to act as boiling sites, promote superheating.

10 Claims, No Drawings

PERCOLATOR PACKAGES AND PROCESS THEREFOR

BACKGROUND OF THE INVENTION

This invention is related to commonly-assigned U.S. Pat. Nos. 3,511,666 and 3,691,718 respectively entitled "Method Of Making A Pelletized Coffee Brewing Package" and "Pouch Forming Apparatus And Method" both of which are hereby incorporated by reference. This invention is also related to commonly-assigned, concurrently filed U.S. Pat. application Ser. No. 365,305, entitled "Coffee Percolator Packages And Method," which discloses the sealing of coffee tablets within porous filter material, the seal containing at least one unsealed portion through which a small amount of coffee particles may pass during percolation. These coffee particles act as boiling sites within the percolator and reduce the incidence of superheating.

This application is concerned with coffee percolator packages which contains one or more tablets of coffee and which is designed for use in a home-type percolator. The percolator package contains a measured amount of roasted and ground coffee, usually in the form of a compressed tablet, which is enclosed in a pouch of filter material having a porosity which permits ready extraction of coffee solids, while confining almost all the coffee grounds within the package for easy discard thereof after use.

The preferred form for the percolator package is that of a circular ring in which an annular tablet of compressed coffee is enclosed within an annular pocket of filter material. This annular shape is desirable because of the use to which pouch will be put, i.e., placed in the percolator basket of a household electric or stove top percolator. The formation of an annular pocket normally requires that upper and lower plies of filter wrapping material be joined together both in a seal extending around the inner circumference of the annular article and in a seal around the outer circumference of the annular article.

Equipment capable of forming such annular percolator packages from a continuous web of heat sealable wrapping material and a continuous feed stream of compressed annular tablets is fully described in aforementioned U.S. Pat. No. 3,691,718. Methods and means for forming the compressed coffee tablets are fully described in aforementioned U.S. Pat. No. 3,511,666 where it is also noted that the coffee tablet should be packaged in a manner which assures void space inside the filter material, in order to provide for proper circulation of the water through the bed of coffee during percolation. If less than 30% void space is present within the filter wrapping, the coffee which swells upon wetting will form a compact bed which may not allow proper extraction of coffee solids. In extreme cases, the bag itself may rupture since the coffee particles swell to about twice their size.

SUMMARY OF THE INVENTION

It has been found that when brewing coffee percolator packages, such as those described above, a clear, substantially sediment-free brew is produced in the percolator. Sediment-free brews are thought to be preferred by the consumer; however, it has been found that such brews, especially when prepared in glass or ceramic stovetop percolators under the influence of high heat inputs, are subject to the phenomenon commonly known as superheating. This superheating phenomenon may be evidenced by "bumping" and erratic boiling of the liquid rather than normal boiling.

It has also been found that this superheating phenomenon is due in large measure to the presence of anionic or nonionic surfactants in the brew. These surfactants, which may be present as a residue from any of the many household detergents commonly used to wash coffee percolators and/or as a result of being extracted from the filter material used to form the percolator package, dewet the surfaces of the percolator on which boiling normally occurs. Inability of gas bubbles produced in the heated, sediment-free brew to adhere to or wet the percolator surface leads directly to superheating.

According to this invention a linear organosiliconoxide polymer is incorporated into the percolator package in order to counteract the effects of the anionic or nonionic surfactants which may be present in the brew. The level of the organosiliconoxide polymer added to or included within the percolator package must be sufficient to produce a concentration of the polymer in the coffee percolate of at least 0.2, and preferably about 2 to 10 parts by weight of the polymer per million parts by weight of the brew liquid (solids-free basis). The organosilicone, usually in the form of an aqueous emulsion, may be incorporated into the percolator package in numerous ways many of which will be apparent to those skilled in the art. The organosilicone may be included within the tablet matrix by adding the polymer to the roasted and ground coffee prior to tabletting and/or coated onto the surface of the preformed tablet. Likewise the organosiliconee may be included with the filter material, such as during the manufacture of nonwoven filter material and/or coated onto the surface of the filter material, either before during or after the percolator package is formed. Alternatively the organosilicon oxide polymer may be encapsulated within a water soluble material, such as by means of the existing microencapsulating technology, and then likewise incorporated into the percolator package.

It may be desirable to combine the interrupted heat seal invention of the aforementioned application, Ser. No. 365,305 with the organosilicone polymer addition of this invention in order to produce a percolator package that will further reduce or minimize the incidence of superheating.

DETAILED DESCRIPTION OF THE INVENTION

U.S. Pat. No. 3,511,666 describes the characteristics of the preferred percolator package of this invention. More particularly, annular-shaped coffee tablets are formed from ground and degassed roasted coffee by compressing the coffee particles under sufficient pressure and for sufficient time to form a self-sustaining tablet which is capable of releasing at least 10% more extractable solids than an equivalent weight of uncompressed roasted and ground coffee. In effecting this compression, normally at a pressure between 8,000 and 13,000 psi, the initial volume of coffee is reduced to between 25% and 40%, preferably 30 to 35%, of the initial charge volume; however, the coffee particles should not be disrupted to the extent that sufficient coffee lipids are expressed to stain the filter wrapping material or produce an undesirable oil film or slick in the percolated brew. During percolation the coffee particles swell and the tablet structure breaks apart to form a readily extractable bed of coffee.

The filter material used to enclose or wrap the compressed tablet can be of any non-toxic, relatively-tasteless or bland, substantially-insoluble material. The porosity of the filter material must be great enough to allow substantial extraction of the coffee. Such a porosity would normally permit substantial migration or dusting of coffee particles through the pores of the bag; however tabletting of the coffee prevents this from occurring. The porosity should be small enough however to prevent migration of the swollen roasted coffee particles during percolation. Normally this will require perforations having a diameter of 0.01 inch to 0.1 inch, preferably 0.03 inch to 0.07 inch. Roughly the porosity of the bag will conform to between an 8 and 60 U.S. mesh screen, preferably between 14 and 20 mesh. The percent open area can range from 10% to 90%. Any natural or synthetic material, or combination thereof which meets the above specifications can be used. Preferably, the material is heat sealable, at least at the portions which will be sealed to enclose the tablet. The use of heat sealable binders and/or the use of heat sealable fibers or films (e.g., polyethylene, polypropylene, etc.) is contemplated.

In the case of annular shaped percolator packages the filter material should form an intimate contact with the percolator spout. This assures a trapping of the percolating water issuing from the top of the spout and avoids serious bypass of the coffee.

This invention is concerned with the prevention of the superheating phenomenon which can occur when the above-described percolator packages are used to produce fresh brewed coffee in a conventional home percolator. As might be expected, the problem of superheating is most apt to occur in stove top percolators, especially of the glass or ceramic type, which are used over high heats.

For normal boiling to occur, gas bubbles must grow at a boiling site. When the heated liquid is sediment free, these boiling sites must be found on the surface of the vessel containing the liquid. The normal boiling process requires that the gas bubbles adhere (wet) to the vessel surface and grow with heat input until the buoyant force is greater than the adhesive force causing the bubble to detach and rise to the liquid/air interface. Smooth surfaces such as those presented by the interior of glass and ceramic coffee percolators have been found to increase the likelihood of superheating.

Superheating occurs when the temperature of the liquid reaches and/or exceed the normal boiling point without allowing the gas to nucleate into a macroscopic bubble and rise. The gas still has to expand, but it does so on the molecular level stretching the spaces between the molecules. The erratic boiling and bumping that may result from superheating occur because the temperature of the liquid rises above its boiling point, increasing the pressure of the gas enough to produce molecular size bubbles. As these bubbles grow their internal pressure is relatively large and rapid, spring-like, expansion of the gas takes place.

When a liquid containing anionic or non-ionic surfactants is heated, gas bubbles cannot adhere to the vessel surfaces. This is so because the surfactant causes wetting of the surfaces by water. Gas bubbles adhere to hydrophobic surfaces but not to hydrophilic surfaces. By nature, solid surfaces are negatively charged and anionic and non-ionic surfactants are adsorbed on these surfaces with their hydrophobic portions towards the surface and their polar group toward the solution. This, in turn, produces a hydrophilic film of water to which the gas bubbles cannot adhere.

It has been found that cationic surfactants (positively charged) are adsorbed onto negatively charged solid surfaces such that the hydrophobic portion is directed towards a solution in contact with it. A similar result is achieved with linear (unbranched) organosiliconoxide polymers (e.g., dimethylpolysiloxane). However, only the organosilicones are preferentially adsorbed at the solid/liquid interface in the presence of solutions which contains anionic surfactants. Cationic surfactants complex and precipitate with anionic surfactants. This precipitate would be regarded as objectionable in a brewed comestible extract; thus, this invention is particularly directed to the use of organosiliconoxide polymers for use in percolator packages.

The level of the organosiliconoxide polymer which is incorporated in the percolator package is as previously mentioned sufficient to produce a concentration of the polymer in the coffee percolate of at lease 0.2, and preferably from about 2 to 10 parts by weight of the polymer per million parts of the brew liquid (water in the case of brewed coffee). It will usually be necessary to incorporate into the percolator package more of the silicone polymer than is desired in the brew since not all of the silicone either within or on the percolator package will be extracted into the brew during a normal percolation cycle. Determination of the proper amount of silicone to add to the percolator package, once knowing the amount to be extracted into the brew, will be readily ascertained by those skilled-in-the-art.

The lower concentration limit of the silicone (0.2 ppm) is considered to be the minimum level of brew silicone which should be obtained from a commercial percolator package considering the level of anionic and/or non-ionic surfactants which might be present in a home brew. These surfactants may be present either because the consumer has not sufficiently rinsed the percolator after washing with a detergent composition, all of which contain substantial quantities of such surfactants as anionic sodium dodecylbenzenesulfonate, and/or because the filter material, especially non-woven, binder-containing fabrics, may contain extractable anionic or non-ionic surfactants which are employed during the production of the fabric and/or which may be present in the binder material. The level of brew silicone that should usually be obtained from commercial percolator packages in order to provide for both production and extraction variances as well as for high detergent residues in the percolator is from about 2 to 10 ppm. An upper level of brew silicone of about 100 ppm exists because the silicone polymers are most readily obtained and employed in the form of aqueous emulsions which themselves contain a non-ionic surfactant. Increased silicone levels supply increased non-ionic surfactants and a point is reached where increased silicone does not produce increased wetting.

This invention is further described but not limited by the following examples:

EXAMPLE I

Annular-shaped coffee tablets were made from fresh roasted, ground and degassed coffee by tabletting the coffee at a rate of 400 tablets per minute in Stokes (Model 340), 15 station, dual feed, rotary press operating at a pressure of about 11,000 p.s.i.g. Each tablet contained about 1.2 ounces of coffee and had internal and external diameters of 1.24 and 2.83 inches respectively. The tablets were then wrapped in a non-woven fabric made of mixed polymeric fibers with a coating of non-toxic, bland resin binder. The fiber portion was 91% viscose rayon fibers and 9% polypropylene fibers. The porosity of the fabric had hole sizes of about 0.03 inches and roughly corresponded to a 16 U.S. mesh screen. This fabric was supplied in roll form which is cut to 5½ to 10½ inch blanks which are folded over and heat sealed around the inside and outside of the annular tablet, as described in U.S. Pat. No. 3,691,718. The fabric was sealed in such a manner so as to provide about 0.5 inch space for the coffee to expand toward both the inner and outer seal. Excess fabric was trimmed to give an annular percolator package having outside and inside diameter of 4.5 and 0.75 inches respectively.

EXAMPLE II

The percolator packages of Example I were placed (two each) into the baskets of identical water-filled, ceramic, stove-top coffee percolators which had previously been washed with a commercial household liquid detergent and rinsed only once. Pots placed on a gas stove at a standardized high heat input and allowed to heat exhibited observable superheating in over 50% of the test population. Other pots which were first subjected to a conventional brewing cycle using moderate heat, allowed to cool, and then reheated using a high heat input exhibited observable superheating during reheating in well over 50% of the test population.

EXAMPLE III

The procedures of Example II were repeated; however, before each of the two heating cycles, 26 milligrams (26 ppm) of dimethylpolysiloxane (G.E. food grade, 30% aqueous emulsion) per liter of water was added to the water-filled pots. In each of the two heating cycles observable superheating was noticed in less than 5% of the test population.

EXAMPLE IV

The procedures of Example II were repeated; however, dimethylpolysiloxane in the form of a 30% aqueous emulsion, was sprayed onto the surface of each of the percolator packages at a level of 20 ppm (based on water in the pot) and the coating was permitted to dry before the percolator packages were placed in the percolator baskets. In each of the two heating cycles observable superheating was noticed in less than 5% of the test population.

Having thus described the invention, what is claimed is:

1. In a coffee percolator package having a compressed tablet of roast and ground coffee said tablet being enclosed by a filter material having a porosity conforming to between about an 8 and 60 U.S. mesh screen, the improvement comprising said package containing an amount of linear organosiliconoxide polymer sufficient to reduce the incidence of superheating when brewing coffee from said package.

2. The percolator package of claim 1 wherein the level of polymer in the package is sufficient to produce a level of polymer in the brew of at least 0.2 ppm based on the weight of the brew liquid.

3. The percolator package of claim 1 wherein the level of polymer in the package is sufficient to produce a level of polymer in the brew of from about 2 to 10 ppm based on the weight of the brew liquid.

4. The percolator package of claim 3 wherein the polymer is coated onto the surface of the percolator package.

5. The percolator package of claim 3 wherein the polymer is dimethylpolysiloxane.

6. The percolator package of claim 1 wherein the filter material has pores of 0.01 inch to 0.1 inch.

7. The percolator package of claim 1 wherein the filter material is a non-woven, binder-containing fabric.

8. A method for reducing the incidence of superheating in sediment-free brews, obtained from coffee percolator packages wherein roasted and ground coffee is compressed into a tablet and enclosed in a filter material having a porosity conforming to between about an 8 and 60 U.S. mesh screen, which brews contain anionic or non-ionic surfactants, comprising including in said brew a linear organosiliconoxide polymer at a level of at least 0.2 ppm based on the weight of the brew liquid.

9. The method according to claim 8 wherein the polymer level in the brew is from about 2 to 10 ppm.

10. The method of claim 9 wherein the polymer is dimethylpolysiloxane.

* * * * *